US006752406B2

(12) United States Patent
Pierce et al.

(10) Patent No.: US 6,752,406 B2
(45) Date of Patent: Jun. 22, 2004

(54) HIGHWAY/RAIL TRAILER AXLE/
SUSPENSION LIFT ASSEMBLY (75) Inventors: Phillippi R. Pierce, Canton, OH (US);
Timothy V. Hess, Smithville, OH (US)

(73) Assignee: The Boler Company, Itasca, IL (US)

( * ) Notice: Subject to any disclaimer, the term of this patent is extended or adjusted under 35 U.S.C. 154(b) by 82 days.

(21) Appl. No.: 10/123,939

(22) Filed: Apr. 16, 2002

(65) Prior Publication Data

US 2002/0149164 A1 Oct. 17, 2002

Related U.S. Application Data (60) Provisional application No. 60/284,306, filed on Apr. 17, 2001.

(51) Int. Cl.$^7$ .......................... B62D 61/12; B60G 11/15
(52) U.S. Cl. .............................. 280/86.5; 280/124.162; 280/124.168
(58) Field of Search ......................... 280/86.5, 124.162, 280/124.164, 124.166, 124.168, 124.111, 124.112, 124.117; 180/209, 24.02

(56) References Cited

U.S. PATENT DOCUMENTS

| | | | | |
|---|---|---|---|---|
| 1,740,734 A | * | 12/1929 | Hellstrand | ............... 280/5.513 |
| 3,263,984 A | * | 8/1966 | Linn | ........................ 267/275 |
| 3,675,941 A | * | 7/1972 | Scheublein et al. | ... 280/124.102 |
| 3,771,812 A | | 11/1973 | Pierce et al. | |
| 3,953,011 A | * | 4/1976 | Staehlin et al. | ............... 267/48 |
| 4,373,738 A | * | 2/1983 | Lange | ..................... 180/24.01 |
| 4,573,704 A | | 3/1986 | VanDenberg et al. | |
| 4,634,141 A | | 1/1987 | Hagan et al. | |
| 4,729,579 A | | 3/1988 | Hagan et al. | |
| 5,588,665 A | | 12/1996 | Pierce et al. | |
| 5,915,705 A | | 6/1999 | VanDenberg | |
| 6,003,885 A | | 12/1999 | Richardson | |

FOREIGN PATENT DOCUMENTS

FR         555162         6/1923

OTHER PUBLICATIONS

One page of Highway Suspension drawing—p. 58, from Wabash National; no date.
One page of a Spring Can Assembly drawing—p. 60, from Wabash National; no date.

* cited by examiner

Primary Examiner—David Dunn
(74) Attorney, Agent, or Firm—Buckingham, Doolittle & Burroughs, LLP; David P. Dureska (57) ABSTRACT An air-free, relatively lightweight lift assembly for an axle/suspension system of a highway/rail convertible semi-trailer, utilizes a transversely-oriented coil torsion spring having a relatively low spring rate. The torsion spring is captured between a stationary plate and a rotatable plate. A flexible link is pivotally attached at its upper end to the rotatable plate and at its lower end to the axle. This assembly results in a variable rate moment arm and continuously increasing leverage when the suspension air spring is over-inflated to lower the system for transfer of the trailer from a highway tractor to a rail bogie, thus enabling use of a less robust air spring. The assembly conversely creates a decrease in leverage at the lifted rail transport position, to securely maintain the axle/suspension system in the rail position. For highway use, the lift assembly provides suspension damping without shock absorbers.

12 Claims, 5 Drawing Sheets

HIGHWAY/RAIL TRAILER AXLE/SUSPENSION LIFT ASSEMBLY

This application claims the benefit of Provisional application No. 60/284,306 filed Apr. 17, 2001.

BACKGROUND OF THE INVENTION

1. Field of the Invention

The invention relates to lift assemblies for semi-trailer axle/suspension systems, and in particular to axle/suspension system lift assemblies for semi-trailers which are convertible between highway and railroad use. More particularly, the invention is directed to an assembly which lifts semi-trailer slider axle/suspension systems when switching the trailer from use in a highway mode to use in a railway mode, wherein lifting of the axle/suspension system is accomplished without the use of air, and instead utilizes a relatively lightweight coil torsion spring which efficiently accomplishes the lifting operation through the use of a variable rate moment arm.

2. Background of the Invention

Tractor-trailers or semi-trailers having slider-mounted axle/suspension systems have been utilized for many years in applications where such trailers are transported over both roadways and railways. More specifically, these trailers are transported by a conventional tractor over roadways, usually short distances, between rail yards or between a rail yard and a destination where trailer cargo is dropped off or picked up. When the trailer is being used in the rail mode, which is its primary function, specialized rail bogies are used to support and adapt the trailer for railroad travel.

More particularly, when it is desired to convert the trailer to railroad use, the tractor backs the trailer, with its axle/suspension system at ride-height or in highway mode, in position adjacent to a rail bogie which is movably engaged with the railroad rails. To enable the rear end of the trailer to clear the bogie for attachment thereto, specialized high capacity air springs in the axle/suspension systems are overinflated to a rebound or transfer position to lower the axle/suspension system away from the trailer, or effectively raise the trailer frame and cargo deck. After the rear end of the raised trailer is positioned adjacent to the bogie and the trailer is backed into engagement with the bogie, the trailer air-ride axle/suspension system air springs are vented. When air is exhausted from each air spring, its respective torsion spring then is free to operate and lift the axle/suspension system to its upwardmost or rail position to clear the trailer tires of the rail. The above procedure obviates the need to lift trailers onto rail bogies with cranes and the like. Also, a plurality of trailers can be mounted on a train in this manner for transport as is well known to those skilled in the art.

Conventional compression springs heretofore have been utilized to accomplish lifting of the axle/suspension system to clear the trailer tires of the rails without the use of air, which is a requirement of the rail carrier. More particularly, pneumatically-operated lift assemblies are well-known but require air supplied by the tractor to operate properly. Since the trailer is disengaged from its tractor for rail use, that air is unavailable. Moreover, the railroads prohibit use of air from the train engine, which is reserved exclusively for braking of the train, and not for such lift assemblies, hence the need for an alternative lifting mechanism. Although such compression springs, which are longitudinally oriented relative to the trailer, satisfactorily perform the function of lifting an axle/suspension system, these springs are relatively inefficient in performing the lift procedure, in part due to their longitudinal orientation relative to the transversely extending axle, and thus must be robust/heavy which adds unwanted weight and cost to the trailer. In fact, a compression spring of the type customarily used in the described applications weighs about 36 pounds. Since railroad carriers require redundancy in such systems, each axle must have two lift springs, thereby adding about 72 pounds to each axle to be lifted on a trailer. Each slider typically has two axles that must be lifted, thus adding a total of about 144 pounds to the trailer in springs alone. Multiplying the number of trailers being transported by the train engine by 144, it can be seen that the added weight/cost is significant. This added weight also is a disadvantage for over-the-road travel.

Compression springs have additional disadvantages. Due to the robustness and weight of such springs, a larger, more robust and expensive air spring is required. More specifically, in order to overcome the bias of the compression spring to lower the axle/suspension system during the operation described hereinabove for transferring the trailer from the tractor to the rail bogie, the higher capacity specialized air spring must be overinflated to a full rebound position of about nine inches from the ride height position, as compared to the full rebound position of about four and one-half inches for an air spring used in a roadway-only trailer air-ride axle/suspension system. However, it is understood that such compression springs do eliminate the need for shock absorbers in the axle/suspension system, since the spring is active at all times and provides suspension damping during roadway use of the trailer.

Thus, a long-felt need has existed for a relatively lightweight and low-cost non-air operated trailer axle/suspension system lift assembly for railroad applications, which nonetheless exhibits more efficient lift capacity without the necessity of a more robust and expensive air spring for lowering the axle/suspension system. The present invention solves the problems of prior art lift assemblies having compression springs, by utilizing a torsion spring to lift the axle/suspension system. The transversely oriented torsion spring exhibits more efficient lifting properties despite its lighter weight and lower cost, yet requires a less robust and lest costly customized air spring than prior art lift assemblies to overcome the bias of the torsion spring when lowering the axle/suspension system, due to the incorporation of a variable rate moment arm into the lift assembly.

SUMMARY OF THE INVENTION

Objectives of the present invention include providing a lift assembly for a semi-trailer slider axle/suspension system, which is capable of lifting the system to an upwardmost or rail position without the use of air.

Another objective of the present invention is to provide such a lift assembly having increased lifting efficiency over prior art lift assemblies, but which also minimizes the force required by the air spring to lower the axle/suspension system to the rebound or transfer position.

An additional objective of the present invention is to provide such a lift assembly which provides suspension damping for over-the-road use of the trailer and eliminates the need for suspension assembly shock absorbers.

Still another objective of the present invention is to provide such a lift assembly which is economical, lightweight, durable in use, easy to install, maintain, and replace.

These objectives and advantages are obtained by the lift assembly of the present invention for an axle/suspension system of a vehicle, the lift assembly including, a coil torsion spring having a pair of ends, means for capturing the spring ends, the means including a rotatable plate operatively engaged with a selected one of the spring ends, a link having upper and lower ends, the link being pivotally attached at its upper end to the rotatable plate and at its lower end to the axle, so that an air spring of the axle/suspension system can overcome the bias of the torsion spring to lower the system, and upon deflation of the air spring the torsion spring can lift the system to a desired height and maintain the system in the lifted position.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Applicants have submitted documents herewith showing and describing conventional prior art compression springs of the type used to lift axle/suspension systems of various types of semi-trailers, including those adapted for use on railroads. The new torsion spring lift assembly of the present invention useful with slider axle/suspension systems of highway/rail semi-trailers is shown in FIGS. 1–3B and is described in detail below.

Figure 1:
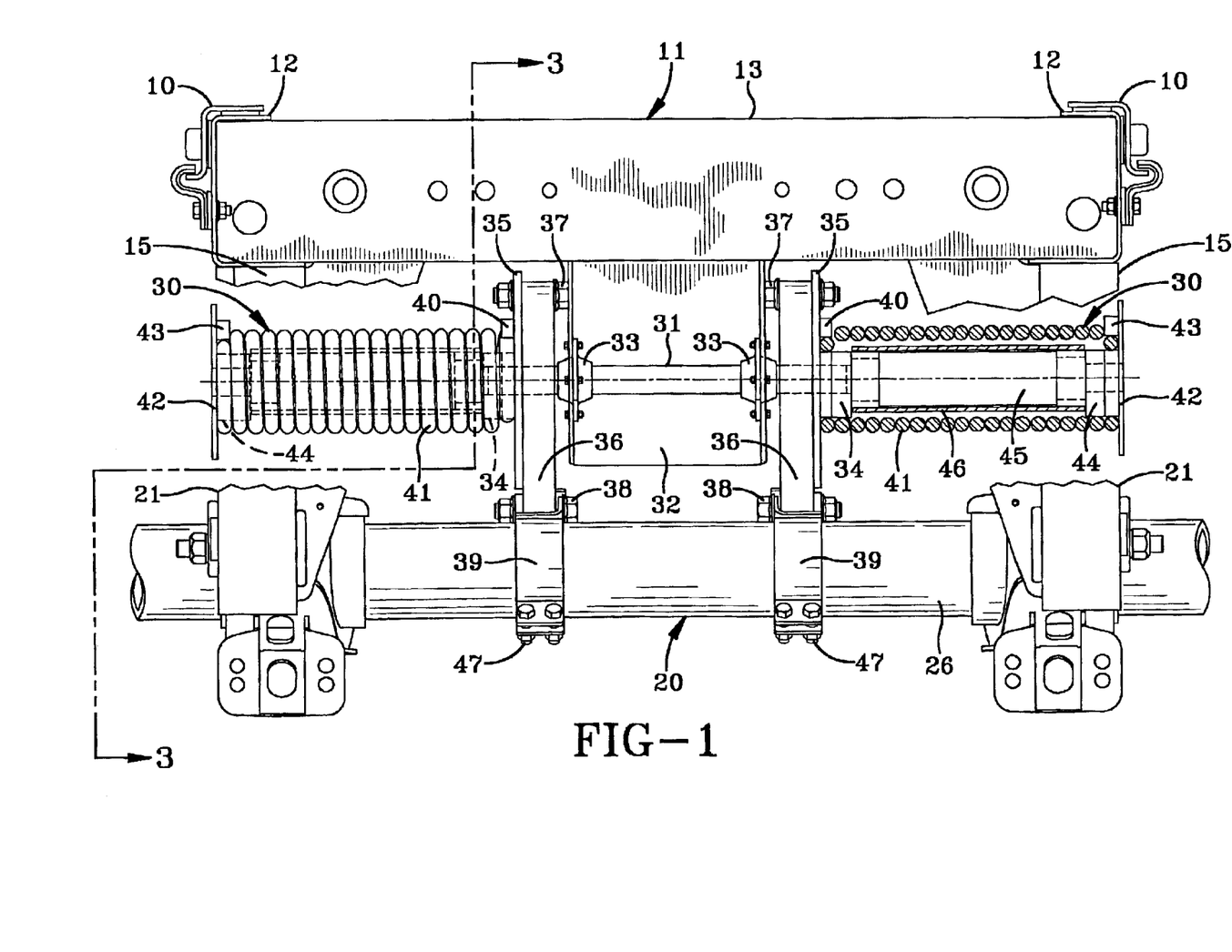
FIG. 1 is a fragmentary rear-end view of a pair of the lift assemblies of the present invention mounted on a highway/rail semi-trailer slider for lifting its axle/suspension system, with portions broken away and in section, and hidden parts represented by broken lines.
Figure 3:
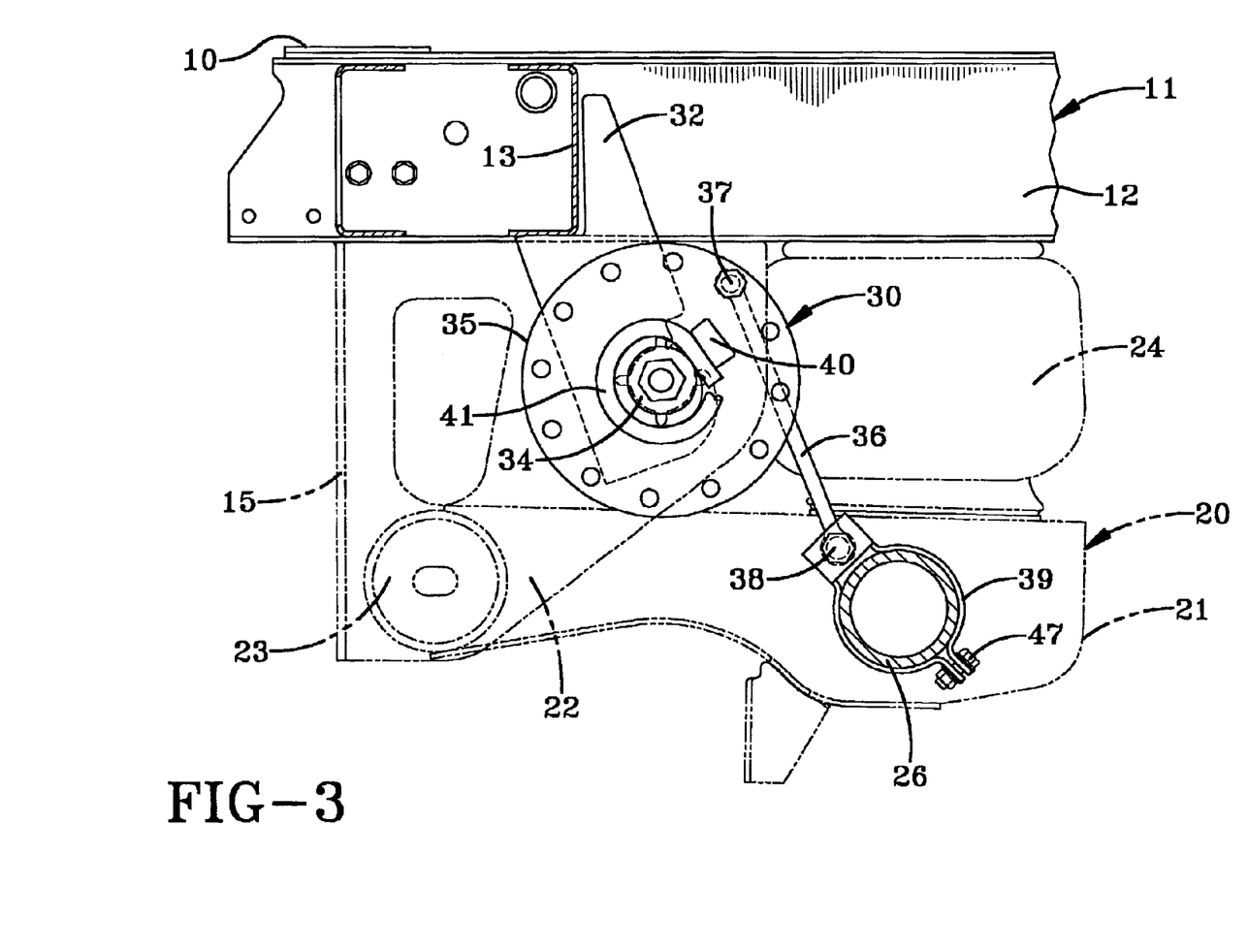
FIG. 3 is a fragmentary side view taken along lines 3—3 in FIG. 1, with portions in section, hidden portions represented by broken lines, and showing in dot-dash phantom lines the suspension assembly at ride-height or in highway mode.
Figure 3A:
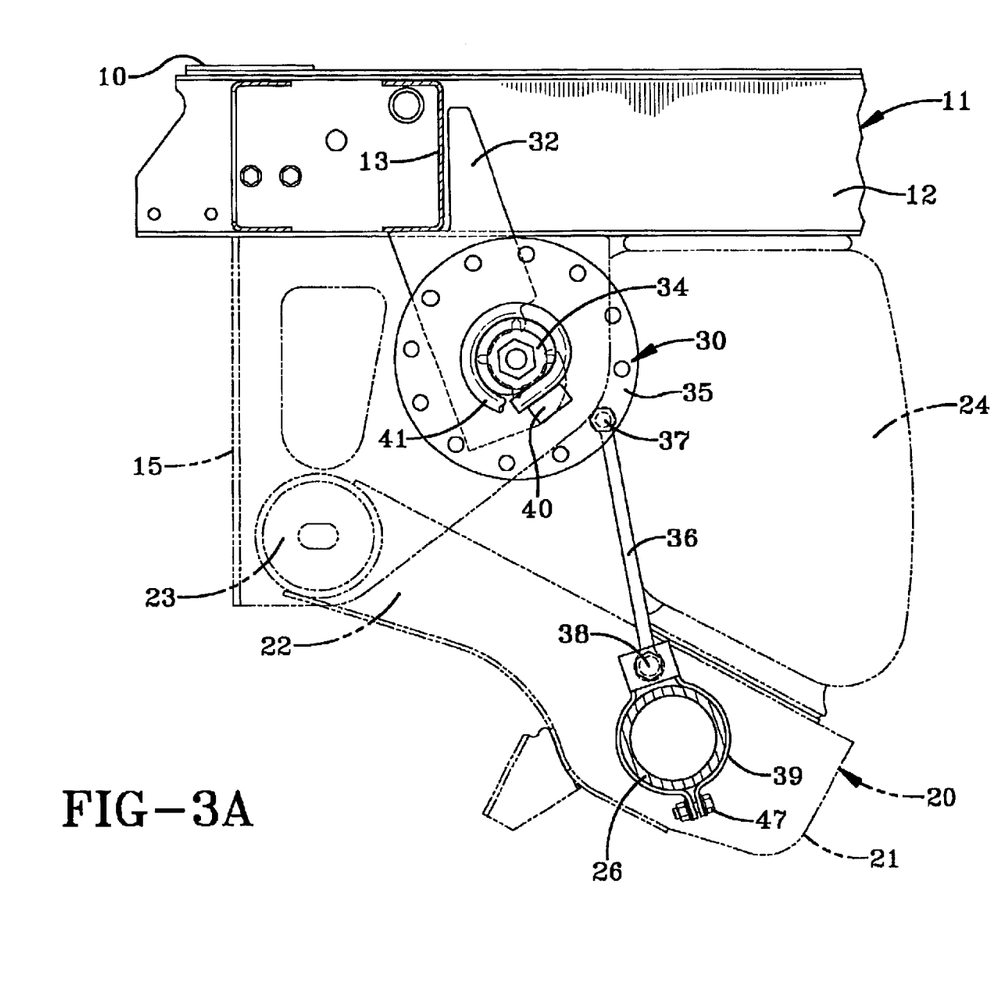
FIG. 3A is a view similar to FIG. 3, but showing the change in position of the lift assembly that takes place in lowering the axle/suspension system or effectively raising the slider and trailer, through overinflation of each suspension assembly air spring, to a rebound or transfer position for positioning the semi-trailer for engagement with a rail bogie.
Figure 3B:
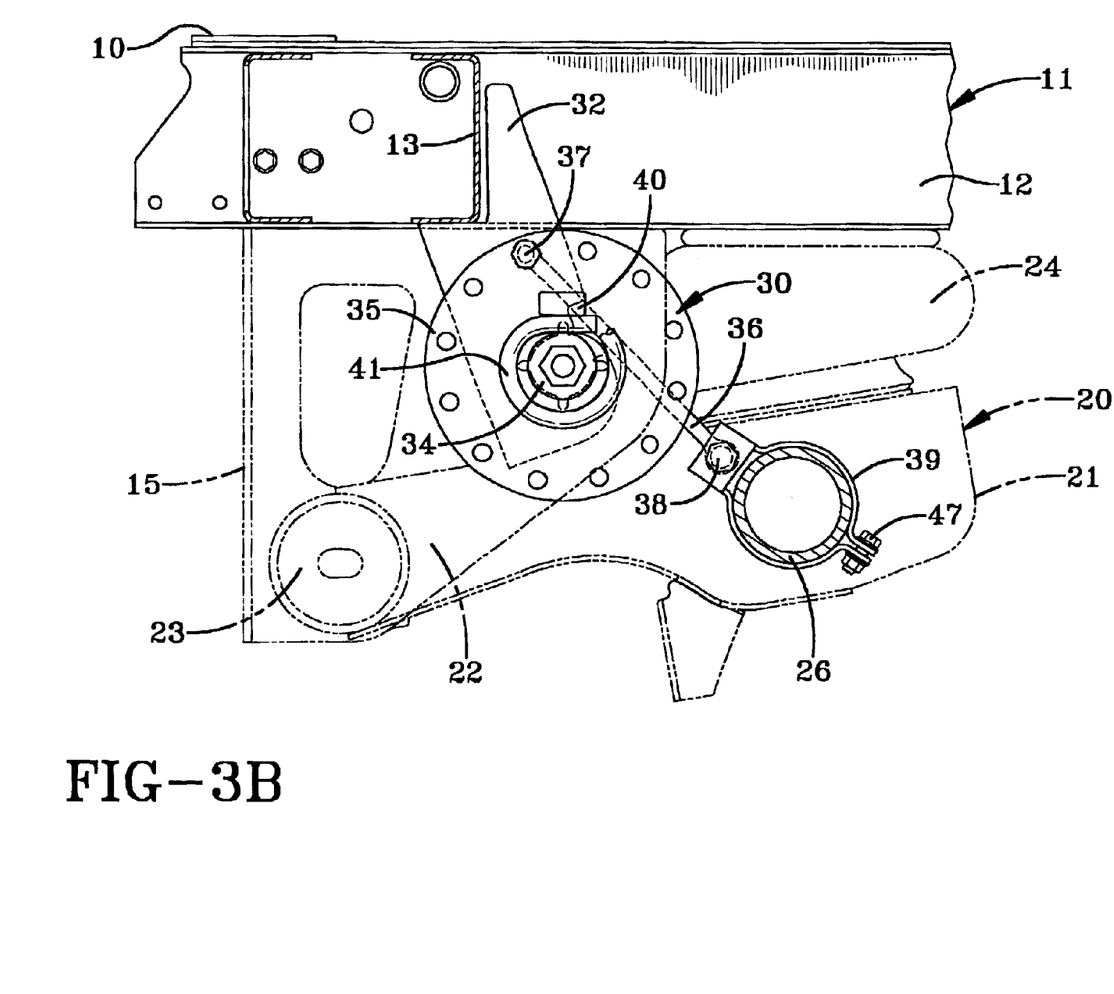
FIG. 3B is a view similar to FIGS. 3 and 3A, and showing the further change in position of the lift assembly that occurs in raising the axle/suspension system to an upwardmost or rail position to clear the trailer wheels of the rails after engagement of the trailer with the rail bogie.

So that the lift assembly of the present invention can be best understood, a typical environment in which it is used, namely, on a semi-trailer designed for both highway and railroad use, also is shown in FIGS. 1 and 3–3B. However, it is understood that the lift assembly of the present invention is useful with virtually any of the many types of slider axle/suspension systems for highway/rail semi-trailers. The semi-trailer slider and axle/suspension system environment described below and shown in the drawings is but one example of an application for the lift assembly of the present invention. Unless specified, all materials described and shown are formed of a rigid, robust material such as steel.

The spaced-apart, parallel, longitudinally extending generally Z-shaped rails of a semi-trailer frame each are indicated at 10 and are shown in FIG. 1. A subframe or slider, indicated at 11, is slidably mounted on rails 10 in a manner well known to those skilled in the semi-trailer art. Slider 11 includes a pair of spaced-apart, parallel, longitudinally extending main members 12, and a plurality of cross members 13 which extend perpendicularly between, nest in and are secured to main members 12 to form the rigid slider structure 11. A bracket or hanger 15 is secured to and depends from the lowermost surface of each slider main member 12 for mounting a suspension assembly on slider 11. More particularly, and as is well known in the art, semi-trailers of the type designed for over-the-road and rail use include a slider-mounted axle/suspension system, as best shown in FIGS. 1 and 3, and indicated at 20. Inasmuch as each axle/suspension system 20 includes a pair of identical suspension assemblies 21, only one suspension assembly will be described.

Each suspension assembly 21 includes a longitudinally extending beam 22 having a bushing assembly 23 at its front end. Bushing assembly 23 includes an elastomeric bushing (not shown) and pivotally mounts the front end of beam 22 on hanger 15 in a well-known manner. An elastomeric air spring 24 is mounted on and extends between the uppermost surface of the rear end of beam 22 and the lowermost surface of its respective slider main member 12. It is understood that air spring 24 is customized for use on semi-trailers designed for dual highway/railroad use, whereby the air spring has a greater capacity than an air spring utilized on a semi-trailer intended solely for highway use. The reason for this increased capacity of air spring 24 will be explained hereinbelow in the description of the operation of the lift assembly of the present invention. An axle 26 extends between and is captured in the pair of beams 22 of each suspension assembly 21 to complete axle/suspension system 20, as best shown in FIG. 1. Wheels and tires (not shown) are mounted on each end of axle 26.

Figure 2:
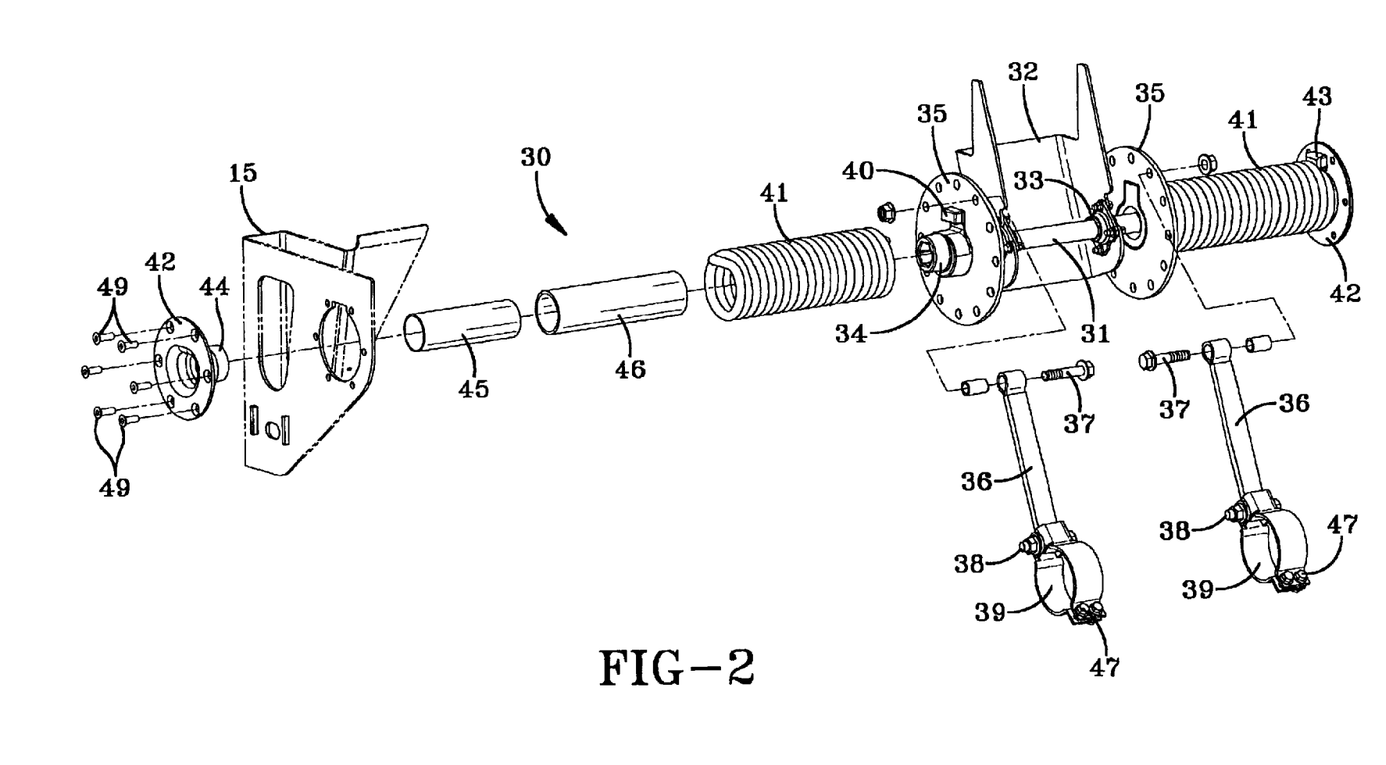
FIG. 2 is an exploded perspective view of the inventive lift assemblies shown in FIG. 1, and showing in phantom lines one of the trailer hangers on which one of the lift assemblies is mounted.

The axle/suspension lift assembly of the present invention is best shown in FIGS. 1–3 and is indicated at 30. Inasmuch as railroad operators require redundancy in such systems, two identical axle lift assemblies 30 are shown attached to axle 26, but only one will be described in detail hereinbelow. A central shaft 31 is rotatably mounted on a downwardly extending bearing support bracket 32 which is secured, by any suitable means such as welding, to a certain one of cross members 13 of slider 11. Central shaft 31 and bracket 32 are the only components shared by the otherwise separate and redundant axle lift assemblies 30. More specifically, each end of shaft 31 rotatably extends transversely through a conventional spherical bearing 33 mounted, by any suitable means such as fasteners, on its respective sidewall of bracket 32. Shaft 31 preferably has a diameter of one and one-half inches. A hub 34 is welded to its respective end of shaft 31. A wheel or flange plate 35, preferably formed of three-eighths inch thick steel, in turn is welded about hub 34. A strap 36, preferably formed of multi-ply flexible polyester, is pivotally attached by fastener assembly 37 at its upper end to flange plate 35, and is offset inboardly relative to the plate. A lower end of strap 36 similarly is pivotally attached by a fastener assembly 38 to an axle clamp assembly 39, which in turn is immovably clamped on axle 26 by. a fastener assembly 47.

The outboard surface of flange plate 35 is formed with an outboardly extending protrusion 40, which in combination with hub 34 captures the inboard generally D-shaped loop end of a coil torsion spring 41, as best shown in FIGS. 1–3. Torsion spring 41 preferably has a spring rate of about 27.5 inch-pounds per degree. The outboard loop end of torsion spring 41 similarly is D-shaped and is captured by a second smaller diameter and stationary flange plate 42 which is attached, preferably by fasteners 49, to the outboard sidewall of hanger 15. Specifically, the inboard surface of flange plate 42 is welded about a hub 44, which is identical to hub 34 and extends inboardly from the plate. Flange plate 42 similarly is formed with an inboardly extending protrusion 43, which in combination with hub 44, captures the D-shaped outboard loop end of torsion spring 41. A steel sleeve 45 formed with a continuous opening in turn is friction fit at each of its ends onto hubs 34 and 44, and a plastic liner 46 formed with a continuous opening in turn is friction fit about steel sleeve 45. Thus, it can clearly be seen that coil torsion spring 41 is captured between stationary flange plate 42 and rotating flange plate 35, and steel sleeve 45 and plastic liner 46, in combination with hubs 34, 44, serve to further capture the spring in the event that the spring breaks or otherwise fails, thereby minimizing the chance that the spring will escape from its captured state and cause property damage or bodily harm.

Axle/suspension system lift assembly 30 of the present invention operates in the following manner. It is to be understood that highway/rail convertible semi-trailers utilizing slider axle/suspension system 20 typically are free of any shock absorbers such as are commonly utilized in semi-trailer axle/suspension systems intended solely for highway use. This is because coil torsion spring 41 is continuously active and thus provides the damping of suspension assembly 21 normally provided by a traditional shock absorber during over-the-road travel. Prior art compression springs also provided this advantage.

The semi-trailer equipped with lift assembly 30 of the present invention typically is picked up at a railroad terminal or at a cargo drop-off or pick-up location and is transported, usually a short distance by a tractor, over-the-road to another railroad terminal. The over-the-road or highway ride-height position of axle/suspension system 20 is shown in FIG. 3, wherein air spring 24 is inflated to highway ride-height. Once at the drop-off location rail yard, the semi-trailer is backed up to a rail bogie which is positioned on the rails to receive the trailer. In order to back the rear end of the trailer into position for engagement with the rail bogie, as is well known to those skilled in the art, the axle/suspension system must be lowered to effectively raise the trailer frame and deck to a height enabling it to clear the top of the bogie, as best shown in FIG. 3A. This movement necessitates the use of special or custom air springs 24, since full rebound in a traditional axle/suspension system is only about four-and-one-half inches, which doesn't raise the trailer enough to clear the bogie for transfer. In contrast, when customized air springs 24 are overinflated to full rebound position, they lower axle/suspension system 20 about nine inches from the ride-height position illustrated in FIG. 3. It is understood that air spring 24 must generate enough force to overcome the bias of lift assembly torsion spring 41, which will be discussed more fully below.

After the raised rear end of the trailer is backed into engagement with the rail bogie, air is vented from air springs 24 to enable torsion springs 41 to lift axle/suspension system 20. More particularly, axle/suspension system 20 must be lifted to its uppermost or rail position, as best shown in FIG. 3B, to clear the trailer tires of the rails. This is accomplished by lift assembly 30 of the present invention. More specifically, after air is exhausted from air springs 24, axle/suspension system 20 is lifted to its uppermost or rail position shown in FIG. 3B, wherein the wheels of the vehicle (not shown) are lifted away from the railroad rails for transport of the semi-trailer via railroad. It is understood that the uppermost or rail position shown in FIG. 3B is not the full jounce position of air spring 24, wherein the bumper (not shown) within the air spring is fully compressed. Rather, the rail position shown in FIG. 3B is slightly lower than the full jounce position by a distance equal to the difference between an uncompressed air spring bumper and a fully compressed bumper.

In accordance with standard practice in the industry, and as discussed hereinabove, railroads require that axle/suspension systems of highway/rail semi-trailers must be lifted without the use of air. As previously noted herein, longitudinally-oriented compression springs traditionally have been used to accomplish this task. Such compression springs, however, usually weigh about 36 pounds, and since redundancy is required in the railway industry, two compression springs per axle are required resulting in an additional 72 pounds of weight per axle. Since each trailer typically carries two axles, it can be seen that about 144 pounds of additional weight per trailer is added by the compression springs alone during transport. Multiplying that number by the number of semi-trailers being transported by a train engine over the railway, it can been seen that a large amount of additional unwanted weight is added to the transportation process, thereby adding unwanted cost.

Such prior art compression springs operate in the following manner. When the customized air spring is overinflated to lower the axle/suspension system, thereby raising the height of the semi-trailer for transfer of the trailer to the rail bogie, the air spring forces maximum compression of the spring resulting in stored potential energy in the compression spring. After engagement of the trailer with the rail bogie and exhaustion of air from the air spring, the energy stored in the compression spring is used to lift the axle/suspension system to clear the trailer tires of the rails. However, due to its longitudinal orientation relative to the transversely extending axle, which is necessary to enable the compression spring to perform the lifting function, the compression spring is not extremely efficient for the described lifting operation, thus necessitating a robust and heavy compression spring. It is this robust and heavy compression spring having a relatively high spring rate that in turn results in the need for a larger air spring capable of overcoming the bias of the compression spring to lower the axle/suspension system for the transfer operation described above. Requiring a more robust air spring also adds unwanted cost to the axle/suspension system. Thus, there has been a long felt need in the railroad industry for a lift assembly that is lighter yet which has more efficient lift capacity, namely, enabling more efficient lifting of the slider axle/suspension system of highway/rail semi-trailers, especially when the trailer is carrying heavier loads. Under such heavy loads, prior art compression spring assemblies often failed to lift the trailer to the required transfer height.

Lift assembly 30 of the present invention markedly minimizes the above-noted problems through the use of a variable rate moment arm flange plate or wheel 35 and link or strap 36, together with coil torsion spring 41, to achieve lifting of axle/suspension system 20. Lift assembly 30 of the present invention generally operates to lift axle/suspension system 20 as described above and solves the noted problems inherent in prior art compression spring lift assemblies in the following manner.

More specifically, torsion spring 41 provides a relatively low spring rate to limit the resistance provided against air springs 24 when the air springs are overinflated to lower axle/suspension system 20 for transfer of the semi-trailer to a rail bogie. Despite this relatively low resistance in torsion spring 41, the spring still provides adequate lift force to lift and maintain axle/suspension system 20 in the upwardmost rail or stored position after air is exhausted from air springs 24. The D-shaped loop on each end of the coil spring 41 not only aids in attachment of the spring to the other components of lift assembly 30, but also assists in torsion load transition into those components during operation of the lift assembly. Certain other components of lift assembly 30, including shaft 31 and spherical bearings 33, provide a low-friction mount that permits flange plate 35 to rotate easily and be adequately supported directly from slider 11 via bearing support bracket 32. Flange 35 also permits tension adjustment of lift assembly 30 in thirty degree increments completely around the flange plate, both for initial installation and for future field requirements to increase the tension in the assembly due to coil spring relaxation that occurs naturally after extended operation.

Also of importance to the present invention is the configuration of flange plate 35, which permits three key positions of the variable rate moment arm which provides excellent leverage to lift assembly 30. More particularly, and as shown in FIG. 3A, when air spring 24 is overinflated to lower axle/suspension system 20 and effectively lift the trailer for positioning on a rail bogie, the variable rate moment arm moves from the one-o'clock highway position shown in FIG. 3 (using fastener assembly 37 as the position reference point) to the four-o'clock transfer position shown in FIG. 3A. Lift assembly 30 employs its best leverage in this range of motion. The moment arm relatively easily overcomes the force in torsion spring 41 because that variable rate moment arm is moving to its shortest length to limit the coil spring forces acting against air springs 24. This is in contrast to the one-o'clock highway position shown in FIG. 3, wherein the moment arm is lengthened to provide suspension system damping by torsion spring 41. In moving upward from the four-o'clock transfer position to the eleven-o'clock rail position shown in FIG. 3B, movement between the four-o'clock position and the one-o'clock position is relatively easy, just as it was in the downward direction. However, the movement from the one-o'clock position to the eleven-o'clock position is the most difficult range of movement because the attachment point of strap 36 at fastener assembly 37 moves behind the central pivot point of flange plate 35 at hub 34 to create the longest variable rate moment arm. In fact, movement between the one-o'clock position and the twelve-o'clock position is easier than movement between the twelve-o'clock position and the eleven-o'clock position, because a negative moment arm actually occurs in moving past the twelve-o'clock position to the eleven o'clock position, thus creating reduced leverage in lift assembly 30. However, it is this negative moment arm which securely maintains lift assembly 30 in its upwardmost position. When it is desired to again lower the axle to the highway position shown in FIG. 3 for over-the-road transport, moving the axle/suspension system 20 from the eleven-o'clock position to the twelve-o'clock position is again difficult due to the negative variable rate moment arm, but becomes easier in moving from the twelve-o'clock position to the one-o'clock position, just as in the upward direction. Again, moving from the one-o'clock highway position as shown in FIG. 3 to the four-o'clock transfer position shown in FIG. 3A is the easiest for air spring 24 to accomplish due to the relatively low spring rate of torsion spring 41 and continuously shortening variable rate moment arm and increasing leverage. Thus, it can be seen that the operatively connected combination including torsion spring 41, rotating flange plate 35, and link or strap 36 attached to the rotating flange plate and axle 26, create the efficient variable rate moment arm that makes efficient lifting and lowering of axle/suspension system 20 possible. This arrangement of parts also results in the need for a less robust air spring 24 for the lowering operation.

In addition, it can be seen that polyester strap 36 provides a heavy-duty yet flexible connection between rotating flange plate 35 and axle clamp assembly 39. The pivot attachment at fastener assembly 37 of strap 36 onto flange plate 35 is offset or cantilevered so that a clamp load is avoided. Strap 36 also provides the downward travel limitation for axle/suspension system 20 whereby as axle clamp assembly 39 moves through the travel arc it rotates approximately 45 degrees forward from the generally vertical position shown in FIG. 3A when the axle/suspension system is in its transfer position, to the rail position shown in FIG. 3B. It can be seen that clamp assembly 39 is in line with system forces when the axle is in this lowest position and provides a travel stop. It is understood that other types of straps or even a more rigid metal arm could be utilized, but more rigidity is not preferred because it could cause the link to buckle during operation.

It is understood that various other structural parts and arrangements may be used to support and capture transversely oriented coil torsion spring 41 without affecting the overall concept of the present invention. For example, plate 35 may be different shapes and/or sizes. Moreover, it is further understood that various materials may be used to form such alternative parts, as well as flexible strap 36.

Thus, it can be seen that the present invention lift assembly 30 including transversely oriented coil torsion spring 41, together with rotating flange plate 35 and flexible strap 36, combine to create a very efficient variable rate moment arm for air-free lifting of axle/suspension system 20, as well as more efficient lowering of the axle/suspension system, with the added benefits of reduced weight and cost over prior art lift assemblies utilizing compression springs.

It is further understood that although the preferred application for lift assembly 30 of the present invention is on semi-trailers which are convertible between highway and railroad use, the lift assembly could have applications in semi-trailers intended for over-the-road or highway-only use if desired. For example, lift assembly 30, as noted, has more efficient lifting capability which could be useful in semi-trailers having the need for longer/higher travel of an axle/suspension system, such as in certain gasoline tankers which supply gas stations. Also, redundancy is not required in highway-only semi-trailer applications, thus, one lift assembly 30 per axle would be sufficient. Use of lift assembly 30 in such semi-trailer highway-only applications also would eliminate the need for a latch or mechanical lock to securely hold the axle/suspension system in its upwardmost position. Moreover, since air is eliminated from lift assembly 30, make-up air is not required to hold the axle/suspension system in its lift position, since it is well known that use of a lift mechanism utilizing an air bag naturally loses some air during operation, requiring a constant supply of such make-up air. It also is understood that the low spring rate of coil torsion spring 41 can be varied within a relatively wide range, depending on the application, without affecting the overall concept of the present invention.

Accordingly, the improved lift assembly for axle/suspension systems of highway/rail semi-trailers of the present invention is simplified, provides an effective, safe, inexpensive, and efficient assembly which achieves all the enumerated objectives, provides for eliminating difficulties encountered with prior lift assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved lift assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A lift assembly for an axle/suspension system of a vehicle, said lift assembly including:
   a) a coil torsion spring having a pair of ends;
   b) means for capturing said spring ends, said means including a rotatable plate operatively engaged with a selected one of the spring ends;
   c) a link having upper and lower ends, said link being pivotally attached at its upper end to said rotatable plate and at its lower end to said axle, so that an air spring of said axle/suspension system can overcome the bias of said torsion spring to lower said system, and upon deflation of said air spring the torsion spring can lift the system to a desired height and maintain said system in said lifted position.

2. The lift assembly of claim 1, in which said torsion spring is disposed substantially parallel to said axle.

3. The lift assembly of claim 2, in which each one of said pair of ends of the torsion spring is generally D-shaped.

4. The lift assembly of claim 3, in which said torsion spring has a spring rate of about 27.5 inch-pounds per degree.

5. The lift assembly of claim 1, in which said link is a substantially flexible strap.

6. The lift assembly of claim 5, in which said strap upper end is offset from the peripheral edge of said rotatable plate.

7. The lift assembly of claim 6, in which the attachment location of said strap upper end is adjustable to a plurality of locations; and in which each of said locations is spaced thirty-degrees apart along the periphery of said plate.

8. The lift assembly of claim 7, in which said rotatable plate is immovably mounted on a hub; in which said hub is immovably mounted on a shaft; and in which said shaft is rotatably mounted in a bearing which in turn is mounted on a stationary bracket.

9. The lift assembly of claim 8, in which said bracket is mounted on said vehicle frame.

10. The lift assembly of claim 1, in which said vehicle is a semi-trailer convertible between highway and railway use.

11. The lift assembly of claim 1, in which said vehicle is a semi-trailer useful for highway-only applications.

12. A lift assembly for an axle/suspension system of a vehicle, said lift assembly including:
   a) a coil torsion spring having a pair of generally D-shaped ends;
   b) means for capturing said spring ends, said means including a rotatable plate immovably mounted on a first hub, said hub being immovably mounted on a shaft, said shaft being rotatably mounted in a bearing which in turn is mounted on a stationary bracket, said bracket being mounted on a frame of said vehicle, said rotatable plate and said first hub cooperating to operatively engage a selected one of said D-shaped ends of said coil torsion spring;
   c) a stationary plate mounted on a hanger of said axle/suspension system and being immovably mounted on a second hub, said stationary plate and its respective hub cooperating to engage the other one of said D-shaped ends of said coil torsion spring for capturing the spring; and
   d) a substantially flexible strap having upper and lower ends, said strap upper end being adjustably attached to a selected one of a plurality of locations on said rotatable plate and being offset from a peripheral edge of the plate, each one of said locations being spaced thirty-degrees apart along the periphery of said plate, said strap lower end being attached to said axle, so that an air spring of said axle/suspension system can overcome the bias of said torsion spring to lower said system, and upon deflation of said air spring the torsion spring can lift the system to a desired height and maintain said system in said lifted position.

* * * * *